Dec. 9, 1958
J. F. SHAFER
2,863,594
FOLD UP AND ROLLAWAY STEP
Filed Sept. 1, 1955
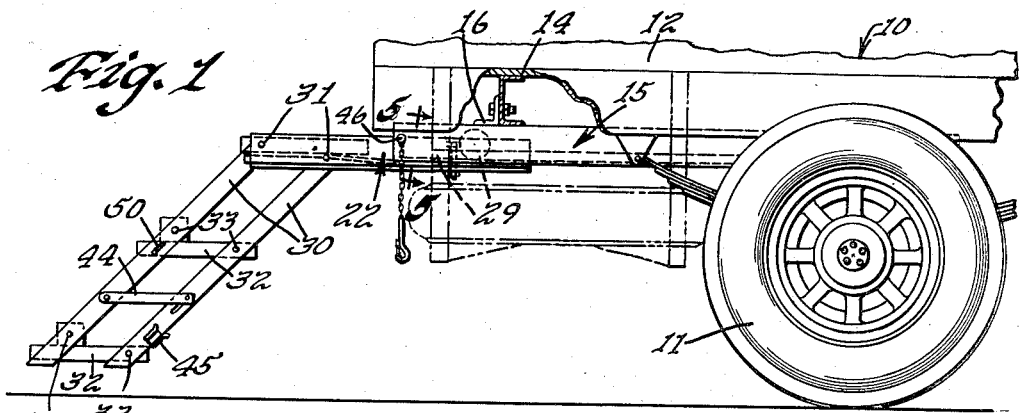
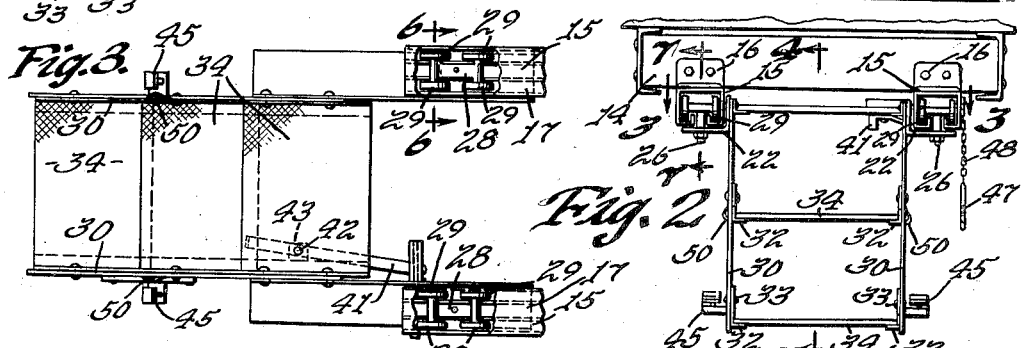
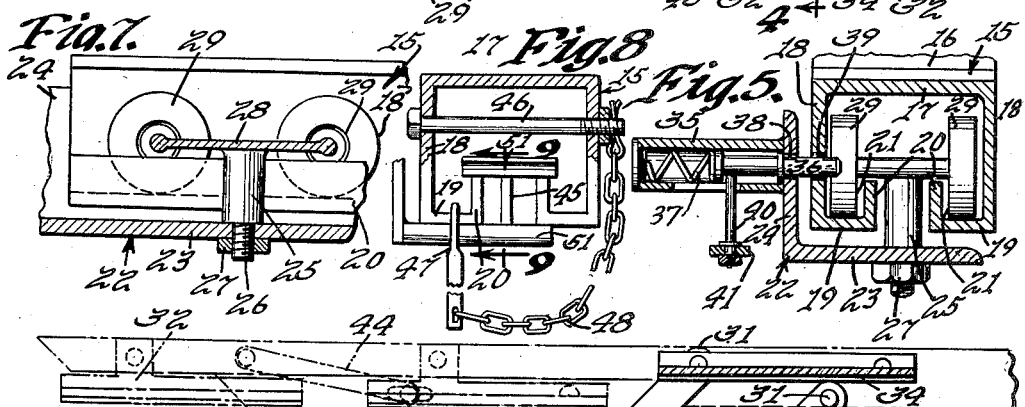
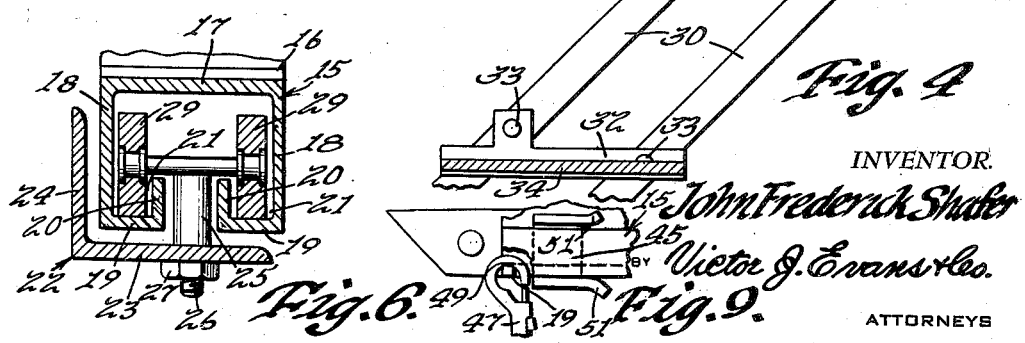
INVENTOR.
John Frederick Shafer
BY Victor J. Evans & Co.
ATTORNEYS

2,863,594
FOLD UP AND ROLLAWAY STEP

John Frederick Shafer, Greenville, Pa.

Application September 1, 1955, Serial No. 532,062

1 Claim. (Cl. 228—48)

This invention relates to a vehicle, such as a truck, and more particularly to a retractible and extensible ladder or step construction for a vehicle.

The object of the invention is to provide a step or ladder construction which can be readily extended when it is to be used and wherein the step can be readily retracted when it is not being used.

Another object of the invention is to provide a step or ladder construction for a vehicle such as a truck, whereby when it is desired to gain access to the body of the truck, the step can be readily moved to its downward extended position, and whereby when the step is not being used it can be readily folded and moved to an out-of-the-way position below the truck body.

A further object of the invention is to provide a vehicle step construction which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary side elevational view, with parts broken away and in section, showing the step in extended operative position.

Figure 2 is a fragmentary end elevational view of the vehicle, showing the step in extended position.

Figure 3 is a plan view of the step in extended position, with parts broken away and in section.

Figure 4 is a sectional view taken on the line 4—4 of Figure 2.

Figure 5 is a sectional view taken on the line 5—5 of Figure 1.

Figure 6 is a sectional view taken on the line 6—6 of Figure 3.

Figure 7 is a sectional view taken on the line 7—7 of Figure 2.

Figure 8 is a fragmentary sectional view illustrating the locking mechanism.

Figure 9 is a sectional view taken on the line 9—9 of Figure 8.

Referring in detail to the drawings, the numeral 10 designates a portion of a vehicle such as a truck, and the vehicle 10 includes the usual rear wheels 11, Figure 1, and there is provided a body 12 which may include transversely extending beams or cross ties 14.

The present invention is directed to a step or ladder construction which is adapted to be used for permitting access to and from the body 12 of the vehicle 10. The step construction includes a pair of spaced parallel horizontally disposed channel members 15 which may be secured beneath the cross ties 14 in any suitable manner, as for example by means of brackets 16. Each of the channel members 15 has the same construction and each includes a top wall 17, spaced parallel vertically disposed side walls 18, bottom sections or walls 19, and upstanding vertically disposed flanges 20, Figure 6. The flanges 20, and walls 19 and 18 coact to define therebetween trackways 21 for a purpose to be later described.

Adjustably connected to each of the channel members 15 is a body member 22 of L-shape. Each of the body members 22 has the same construction and each includes a horizontal leg 23 and a vertical leg 24. A post or pin 25 extends upwardly from each of the horizontal portions 23 of the body members 22, and depending from each post 25 is a threaded stud 26, there being a nut 27 arranged in threaded engagement with the stud 26 for maintaining the post 25 connected to the body member 22. A plate 28 is secured as by welding to the upper end of each of the posts 25, and wheels or rollers 29 are journaled on the plate 28, the rollers 29 mounted for travel through the trackways 21.

There is further provided bars 30 which have their ends pivotally connected to the body member 22 by means of pins or bolts 31. A pair of the bars 30 may be pivotally connected to each of the body members 22. Brackets 32 are pivotally connected to the bars 30 by means of pins or bolts 33, and support members or steps 34 may be secured to the brackets 32 in any suitable manner, as for example by welding.

A means is provided for locking the body members 22 in their outward extended position, and this means comprises a casing 35 which may be welded to one of the body members 22, Figure 5. A plunger 36 is mounted for movement into and out of engagement with openings 38 and 39 in the body member 22 and the corresponding channel member 15. A coil spring 37 is provided for normally urging the plunger 36 into the position shown in Figure 5. For retracting the plunger 36, a handle 41 has its rear end pivotally connected to a pin member 40 which depends from the plunger 36, and the handle 41 is pivotally connected to a lug 43 by means of a pin 42. Thus, by actuating the handle 41, the plunger 36 can be retracted to compress the coil spring 37 whereby the body members 22 can be shifted inwardly with respect to the channel members 15. Braces 44 may be pivotally connected between the bars 30 for helping to steady the step when the step is in operative or extended position as shown in Figure 1. Clips 45 may be provided whereby these clips 45 can be arranged in engagement with a suitable supporting structure when the step is in folded retracted position.

From the foregoing it is apparent that there has been provided an extensible or retractible step construction for use with a vehicle such as a truck. In use, when access is to be gained to the truck body 12 as for example when merchandise is to be loaded or unloaded therefrom, then the parts can be arranged in the position shown in Figures 1, 2 and 3. Thus, a person can readily walk up the steps 34 or down the steps 34 to gain access to or from the truck body. The plunger 36 projects through the registering openings 38 and 39 to maintain the body members 22 in their extended position. When the steps are not being used, as when the truck is to travel to a different location, the handle 41 can be pivoted about the pin 42 to thereby retract the plunger 36 so as to permit the channel members 22 to be moved inwardly with respect to the channel members 15. At the same time the bars 30 can be pivoted from the solid line position shown in Figure 4 to the broken line position of Figure 4 so that the entire assembly occupies a minimum amount of space. The clips 45 may help to hold the parts in their assembled or retracted position when the steps are not being used. The rollers 29 facilitate the movement of the body members 22 along the channel members 15, and the rollers 29 travel in the trackways 21.

The step can be folded so that it occupies a very small space when not being used and the present invention does not interfere with normal use of the truck or with the use of a hydraulic jack or with the accessibility of the spare tire. Also, the step will extend to a position contiguous to the ground when in extended position so that it is convenient to use. Also, as shown in Figure 1 when the step is in extended position, the lowest step or rung does not engage the ground so that the step can be used even where the ground is uneven. Further, no changes or material alterations to the truck need be made when using the present invention. A bolt 46 is provided for preventing the rollers from moving all the way out of the channel members 15, but by removing the bolt 46, Figures 1 and 8, the entire assembly can be removed from the truck if desired.

There is further provided a means by which the steps are maintained or prevented from coming out when in their folded position. This means is illustrated in Figures 8 and 9. This locking mechanism operates as follows. The clip 45 is adapted to engage the wall 20 of the channel member 15 when the steps are in the folded position shown in Figures 8 and 9. A snap lock or clamp 47 is connected to the bolt 46 by means of a chain 48, and the snap lock 47 is adapted to engage an opening 49 in the wall 19 of the channel member 15. Thus, when the steps are to be pulled out, it is only necessary to unsnap the lock 47 from the opening 49 so that the clip 45 is free to move along the wall 20 whereby the steps can be unfolded. Furthermore, with the present invention, the construction can be readily changed to a two step assembly by cutting the brace 30 so that it is shorter and then eliminating one step. The chain 48 may be maintained connected to the bolt 46 by means of a cotter pin.

Guides 50 may be mounted on the bars 30, and bent lugs 51 may be provided on the clips 45 whereby these members 50 and 51 will help to guide and align the parts as they move. Thus, the guides 50 which are arranged on both sides of the bars 30 to facilitate the sliding of the steps in the track. The curved portions 51 aid in facilitating the movement of the steps into and out of the tracks.

I claim:
A device of the character described, comprising a pair of spaced parallel horizontally disposed channel members each embodying a horizontally disposed top wall, spaced parallel vertically disposed side walls, horizontally disposed bottom walls and upwardly extending flanges; said flanges, bottom walls and side walls coacting to define therebetween trackways, an L-shaped body member adjustably connected to each of said channel members, each body member including a horizontal leg and a vertical leg, a post extending upwardly from each of the horizontal legs of the body members, a threaded stud depending from each post, a securing element arranged in threaded engagement with each stud for maintaining the post connected to the body member, a plate secured to the upper end of each of said posts, rollers journalled in said plate and movably mounted in said trackways, a pair of bars having their ends pivotally connected to each body member, braces connected to said bars, brackets pivotally connected to said bars, steps secured to said brackets, a casing secured to one of said body members, there being openings in said body member and the adjacent channel member, a plunger mounted for movement into and out of engagement with said openings, a coil spring for normally urging the plunger into engagement with said openings, a pin member depending from said plunger, a handle connected to said pin member, and a lug having said handle pivotally connected thereto.

References Cited in the file of this patent

UNITED STATES PATENTS

| | | |
|---|---|---|
| 854,789 | Woyak | May 28, 1907 |
| 1,222,876 | Lewson | Apr. 17, 1917 |
| 2,170,870 | Nichols | Aug. 29, 1939 |
| 2,230,015 | Rich | Jan. 28, 1941 |
| 2,279,329 | King | Apr. 14, 1942 |
| 2,600,670 | Minium | June 17, 1952 |
| 2,642,217 | Jennings | June 16, 1953 |
| 2,678,831 | Fisher | May 18, 1954 |
| 2,732,919 | Johnson | Jan. 31, 1956 |
| 2,764,422 | McDonald | Sept. 25, 1956 |